March 7, 1950     B. T. ALDERMAN     2,499,620
PNEUMATIC HAMMER FOR DOZER BLADES
Filed April 8, 1946     2 Sheets-Sheet 1
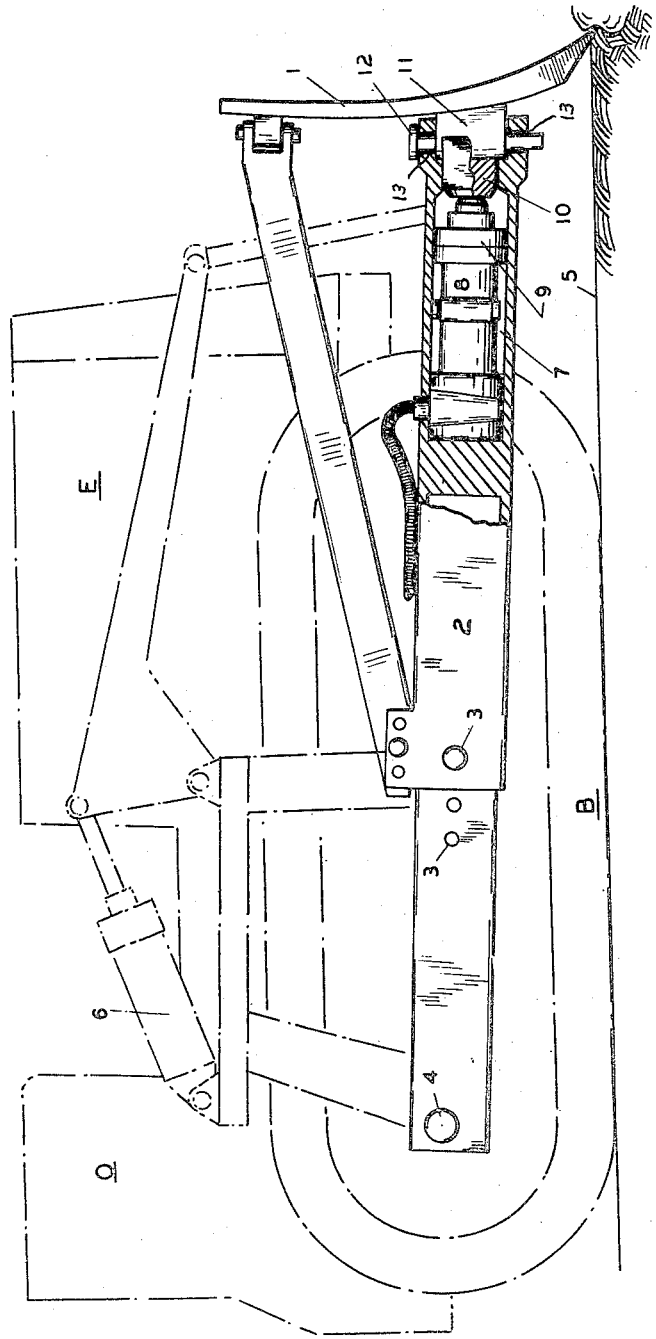
INVENTOR.
BLAIR T. ALDERMAN
BY
ATTORNEY

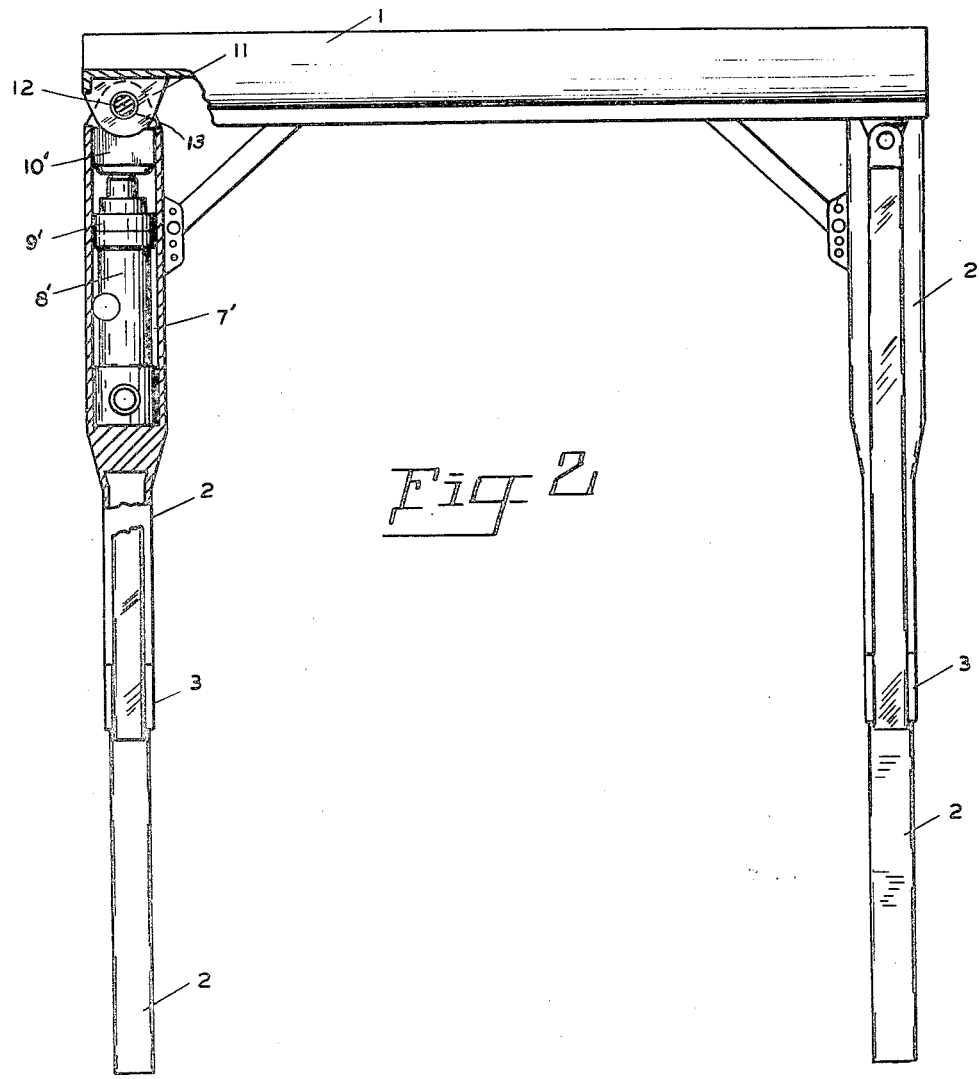

Patented Mar. 7, 1950

2,499,620

UNITED STATES PATENT OFFICE 2,499,620

PNEUMATIC HAMMER FOR DOZER BLADES

Blair T. Alderman, Eugene, Oreg., assignor of one-half to Victor T. Wiglesworth, Portland, Oreg.

Application April 8, 1946, Serial No. 660,444

4 Claims. (Cl. 37—144)

This invention relates to bulldozer blades as used on crawler type tractors. Another name that seems to be superseding the one supra, is "dozer," which will be used exclusively hereinafter.

A dozer blade of requisite weight and backed by a tractor of one to three hundred horsepower will ordinarily shear off roots and dispose of a growing tree having a six to eight inch trunk, or a subterranean pinnacle of hard-pan or soft rock. However strong the blade of the dozer and however powerful the engine behind it, the limit is soon reached and the driver will be seen backing and charging an obstinate obstruction which wastes time and fuel and is hard on the machine, however rugged.

It is an object to provide a substitute for the backing and charging that is far more effective in overcoming an obstinate stump or other point of resistance and yet does not tend to injure the dozer blade nor the machine which carries it.

The invention resides in incorporating an oversize pneumatic hammer, of the type used in pneumatic percussion tools, within one or both supports between the tractor and the dozer blade, and carrying an air compressor and receiver on the tractor of sufficient size; then when a stubbornly resisting obstacle is contacted, the dozer blade is pushed against the obstacle by the available power of the tractor and at the same time one or both hammers are started, which drives the dozer blade into and through the obstruction if it is capable of being cut; otherwise the powder man takes over. Almost any sort or stump up to one and a half times the resistance of the best one that can be cut without the hammer is given as a cuttable object; and a well anchored piece of granite rock is recited as one that needs blasting but cannot be cut.

Drawings accompany and form a part hereof, in which:

Fig. 1 shows a tractor of the type that is able to operate a dozer, in outline, the invention being shown in a sectioned portion of the dozer strut;

Fig. 2 is a plan view of the dozer blade shown in elevation in Fig. 1, with the invention, the tractor outline being omitted.

Describing the drawings in greater detail. In Fig. 1 is shown the outline of a crawler type tractor solely useful in handling a dozer blade 1, which is supported in advance earth working position by struts 2 that are adjustable for length at 3 and pivotally joined to the tractor frame at 4. The struts are hinged to the blade 1 at both ends to angle the blade 1 obliquely in either direction for laterally shifting the earth as the blade moves; and the blade 1 is settable with respect to the surface of the ground 5 by a hydraulic cylinder 6, all in the well known manner. All of the foregoing is conventional and well known.

The strut 2 is made with an inner chamber 7, within which is mounted a pneumatic hammer 8 of large size arranged to deliver rapid blows by the striker portion 9 suitably attached to the hammer 8, which will be made of fine hardened steel, and which in turn delivers the hammer blow to the set-hammer 10 slidably mounted with one face towards the striker and the opposite face fitted to and bearing against the back of the hinge lug 11 of the blade 1, preferably concaved as shown and the depth of the concaved bearing may vary from relatively shallow as shown at the left top of Fig. 2, to deeper as shown at lower right in Fig. 1. The enlarged bore is a lost motion device 13 arranged to relieve the hinge bolt 12 of the necessity of sustaining the shock of the hammer when it is working. The hinge lug 11 and set-hammer 10 will of necessity require fine steel and careful tempering to sustain their function properly.

Except for unusual size and capacity, the pneumatic hammer 8 will not be essentially different from those used in rock drills, concrete busters and the like tools.

The hammer at the left end of the dozer blade 1, is smaller than the one shown at the right, for the reason that it will seldom be needed, and is not so convenient for the machine operator to watch while at work, which is necessary. Being lighter, the set-hammer 10' is not concaved as much as the set-hammer 10 on the right hand side of the machine. Since the left hand hammer elements are not interchangeable with those on the right hand side, indicated by numerals 7 to 10 inclusive, those lighter but in general corresponding elements at the left are indicated by numerals 7' to 10' inclusive.

In the outline of the tractor, the space E is intended to represent the motive power of the tractor; B represents the ground belts that take the place of wheels; O represents the operator's space within which will be located tractor and hydraulic blade controls as in common use; and the tractor will carry an air compressor and air receiver, not shown, the controls for which will also be located with others in compartment O effective to independently and selectively operate air hammers 8 on both sides of the tractor and affecting both ends of the dozer blade 1 as indicated in Fig. 2.

The invention, therefore, resides in so arranging and combining a pneumatic hammer with a dozer blade that when the tractor driving the blade is "leaning against it" and some cuttable obstacle is resisting the blade, the pneumatic hammer means can drive the edge of the blade into and through the obstacle with little loss of time, small extra expense and none of the shock that accompanies backing and then charging an obstacle.

What I claim as new and desire to secure by Letters Patent, is:

1. A pneumatic hammer for a dozer blade comprising a strut adapted to push the blade against work, said strut having in combination therewith a lost motion coupling, a pneumatic hammer positioned to operate through said coupling and a set-hammer supported in metal-to-metal contact with said dozer blade to transmit the blows of the hammer thereto, to assist said blade in penetrating its work.

2. A pneumatic hammer combination with a dozer blade comprising a tractor operated dozer, a pair of struts, each of which is joined to the tractor by one of its ends and to the blade by its opposite end, each of said struts incorporating a lost motion coupling and pneumatic hammer means mounted on the struts and selectively operative to apply hammer blows, effective to result in cutting impulses at the cutting edge of said blade.

3. A pneumatic hammer combination with a dozer blade comprising a tractor mounted dozer blade, said mounting including a compression strut between said tractor and said blade, said strut incorporating a lost motion coupling, a pneumatic hammer incorporated with the tractor end of said coupling and a set hammer incorporated with the other portion, said set-hammer having direct metallic contact with said blade effective to transmit the energy of said hammer to the cutting edge of said blade.

4. A dozer blade adapted to be pushed against material to be severed and moved, a strut through which pushing force is to be transmitted to said blade, said strut having a pneumatic hammer cylinder formed within its end nearest said blade, a pneumatic hammer operable within said cylinder in combination with a set hammer not subject to pushing force when said blade is working, said pneumatic hammer operable to strike said set hammer and said set hammer having a solid metal-to-metal contact against the blade rearwardly of its cutting edge.

BLAIR T. ALDERMAN.

REFERENCES CITED

The following references are of record in the file of this patent:

UNITED STATES PATENTS

| Number | Name | Date |
|---|---|---|
| 1,351,425 | Kaney | Aug. 31, 1920 |
| 2,108,466 | Allin et al. | Feb. 15, 1938 |
| 2,160,595 | Le Bleu | May 30, 1939 |
| 2,230,704 | Sorensen | Feb. 4, 1941 |

FOREIGN PATENTS

| Number | Country | Date |
|---|---|---|
| 33,057 | France | Feb. 7, 1928 |
| | (Addition to No. 625,815) | |